United States Patent
Boon et al.

(10) Patent No.: US 10,919,247 B2
(45) Date of Patent: Feb. 16, 2021

(54) METHOD AND APPARATUS FOR MAKING A SHEAR WEB

(71) Applicant: Vestas Wind Systems A/S, Aarhus N. (DK)

(72) Inventors: Christopher Boon, Northwood (GB); Olav Davis, Hamble (GB)

(73) Assignee: Vestas Wind Systems A/S, Aarhus N. (DK)

( * ) Notice: Subject to any disclaimer, the term of this patent is extended or adjusted under 35 U.S.C. 154(b) by 165 days.

(21) Appl. No.: 16/309,166

(22) PCT Filed: Jun. 13, 2017

(86) PCT No.: PCT/DK2017/050193
§ 371 (c)(1),
(2) Date: Dec. 12, 2018

(87) PCT Pub. No.: WO2017/215720
PCT Pub. Date: Dec. 21, 2017

(65) Prior Publication Data
US 2019/0160773 A1    May 30, 2019

(30) Foreign Application Priority Data
Jun. 15, 2016    (DK) .................................. 2016 70431

(51) Int. Cl.
*B29D 99/00*    (2010.01)
*B29C 70/44*    (2006.01)
(Continued)

(52) U.S. Cl.
CPC ........ *B29D 99/0028* (2013.01); *B29C 33/306* (2013.01); *B29C 70/44* (2013.01);
(Continued)

(58) Field of Classification Search
CPC ..... B29D 99/028; B29C 70/44; B29C 70/541; B29C 33/306; F03D 1/0675; B29L 2031/085; Y02E 10/721; Y02P 70/523
(Continued)

(56) References Cited

U.S. PATENT DOCUMENTS 2,721,599 A    10/1955    Van de Vanter
3,151,354 A    10/1964    Boggs
(Continued)

FOREIGN PATENT DOCUMENTS

CN    104325577 A    2/2015
CN    107107487 A    8/2017
(Continued)

OTHER PUBLICATIONS

China National Intellectual Property Administration, First Notification of Office Action in CN Application No. 201780049536.4, dated Jun. 28, 2020.
(Continued)

*Primary Examiner* — J. Todd Newton
(74) *Attorney, Agent, or Firm* — Wood Herron & Evans LLP (57) ABSTRACT

A method of making shear webs (16) for a wind turbine blade (10) is described. The method comprises providing an elongate male mould tool (32) having a longitudinally-extending upper mould surface (34) and a longitudinally-extending first side wall (36). A shim (40*a*) is provided adjacent and attached to the first side wall (36) of the mould tool (32). The shim (40*a*) has an inner surface (48) facing towards the first side wall (36), an outer surface (50) facing away from the first side wall (36), and an upper surface (56) defining an extension of the upper mould surface (34). A flange structure (74) is provided that comprises a flange portion and a projecting portion (78). The projecting portion
(Continued)

(78) extends along the length of the flange portion and projects transversely from a surface of the flange portion. Fibrous reinforcing material is arranged on the upper mould surface (34). The flange structure (74) is arranged with respect to the mould tool (32) such that the projecting portion (78) at least partially overlies the upper surface (56) of the shim (40a) and the flange portion at least partially overlies the outer surface (50) of the shim (40a). The fibrous reinforcing material is integrated with the projecting portion (78) of the flange structure (74) by means of a matrix material to form the shear web (16). The shear web (16) is removed from the mould tool (32) with the shim (40a) remaining attached to the mould tool (32).

15 Claims, 9 Drawing Sheets (51) Int. Cl.
 B29C 70/54 (2006.01)
 F03D 1/06 (2006.01)
 B29C 33/30 (2006.01)
 B29L 31/08 (2006.01)

(52) U.S. Cl.
 CPC .......... B29C 70/541 (2013.01); F03D 1/0675 (2013.01); *B29L 2031/085* (2013.01); *Y02E 10/72* (2013.01); *Y02P 70/50* (2015.11)

(58) Field of Classification Search
 USPC .......................................... 416/230; 29/448
 See application file for complete search history.

(56) References Cited

U.S. PATENT DOCUMENTS

| | | | | |
|---|---|---|---|---|
| 3,570,057 A * | 3/1971 | Doyle | ................... | B29C 49/48 425/522 |
| 4,330,248 A * | 5/1982 | Platte | ................... | B29C 49/54 249/102 |
| 4,527,783 A * | 7/1985 | Collora | ................... | B23Q 1/032 269/21 |
| 4,815,960 A * | 3/1989 | Rudolph | ................... | B29C 49/48 249/136 |
| 5,192,383 A * | 3/1993 | Cavin | ................... | B29C 70/52 156/166 |
| 5,346,171 A * | 9/1994 | Kephart | ................... | B29C 31/006 249/102 |
| 5,512,221 A * | 4/1996 | Maus | ................... | B29C 33/308 264/2.2 |
| 5,792,392 A * | 8/1998 | Maus | ................... | B29D 11/00413 264/2.5 |
| 6,003,832 A * | 12/1999 | Ueno | ................... | B29C 33/40 249/134 |
| 6,298,896 B1 * | 10/2001 | Sherrill | ................... | B29C 43/56 156/581 |
| 6,299,964 B1 * | 10/2001 | Riddle | ................... | B29C 33/308 249/155 |
| 7,901,166 B2 * | 3/2011 | Halford | ................... | B23C 3/00 409/132 |
| 8,936,695 B2 * | 1/2015 | Rotter | ................... | B29C 70/44 156/285 |
| 9,427,898 B2 * | 8/2016 | Percival, Jr. | .......... | B29C 43/361 |
| 9,539,739 B2 * | 1/2017 | Ruthrauff | ................ | B28B 7/025 |
| 2008/0256788 A1 * | 10/2008 | Glazebrook | ............ | B23P 19/10 29/700 |
| 2008/0311239 A1 * | 12/2008 | Miller | ................... | B29C 33/306 425/541 |
| 2009/0025448 A1 * | 1/2009 | Krogager | ................ | B29C 70/54 72/341 |
| 2010/0024215 A1 * | 2/2010 | Torres Martinez | ..... | B29C 70/54 29/889.7 |
| 2014/0175700 A1 * | 6/2014 | Cook | ................... | B29C 45/2673 264/297.2 |
| 2014/0178518 A1 * | 6/2014 | Cook | ................... | B29C 45/2675 425/183 |
| 2014/0291877 A1 * | 10/2014 | Takahashi | ............... | B29C 49/48 264/39 |
| 2020/0003176 A1 * | 1/2020 | Villar | ................... | B21D 53/78 |

FOREIGN PATENT DOCUMENTS

| | | | | |
|---|---|---|---|---|
| DE | 102009030860 A1 | | 2/2010 | |
| DE | 102011082664 A1 | | 3/2013 | |
| DE | 102012223707 A1 | | 6/2014 | |
| WO | WO-2012093136 A2 * | 7/2012 | ......... | B29D 99/0028 |
| WO | 2013037466 A1 | | 3/2013 | |
| WO | 2014095870 A1 | | 6/2014 | |
| WO | WO-2015096839 A1 * | 7/2015 | .......... | B29C 70/541 |
| WO | 2016066207 A1 | | 5/2016 | |
| WO | 2016066816 A1 | | 5/2016 | |
| WO | WO-2016066816 A1 * | 5/2016 | ......... | B29D 99/0003 |
| WO | WO-2018137740 A1 * | 8/2018 | ............ | B29C 70/30 |

OTHER PUBLICATIONS

Danish Patent and Trademark Office, Search and Examination Report in PA 2016 70431, dated Jan. 13, 2017.
European Patent and Trademark Office, International Search Report and Written Opinion in PCT Application No. PCT/DK2017/050193, dated Sep. 29, 2017.
European Patent and Trademark Office, International Preliminary Report on Patentability in PCT Application No. PCT/DK2017/050193, dated May 25, 2018.

* cited by examiner

METHOD AND APPARATUS FOR MAKING A SHEAR WEB

TECHNICAL FIELD

The present invention relates to a method of making a shear web for a wind turbine blade and to an associated shear web mould assembly.

BACKGROUND

Figure 1:
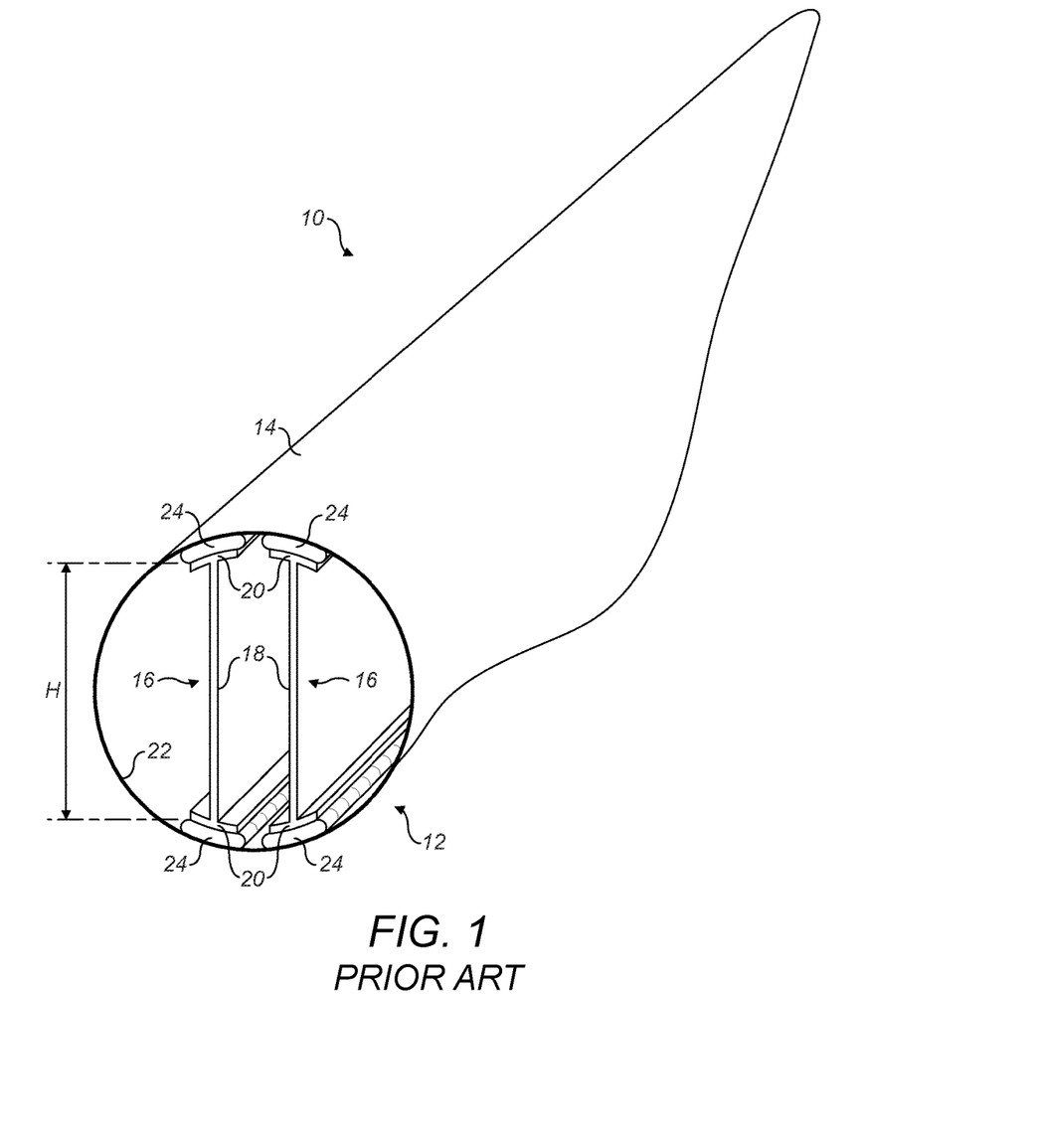

FIG. 1 shows a typical modern wind turbine blade 10 as viewed from a root end 12 of the blade 10. The blade 10 comprises a shell 14 of composite construction. A pair of elongate reinforcing structures known as 'shear webs' 16 extend longitudinally inside the shell 14. The shear webs 16 are generally I-shaped in cross section and comprise a web portion 18 between upper and lower flanges 20. The flanges 20 are bonded respectively to an inner surface 22 of the blade shell 14 by means of adhesive 24.

The shear webs 16 are typically of composite construction and are manufactured in shear web moulds. As the shear webs 16 extend along a significant proportion of the length of the blade 10, the shear web moulds are necessarily large and expensive structures.

It is sometimes desirable to make slight variations to the dimensions of the shear webs 16 to adapt to changes in the blade design or changes in the blade materials. It may also, for example, be necessary to make the blade shell 14 thicker or thinner in parts depending upon whether the blade 10 is to be used in high or low wind classes.

It is burdensome and expensive to produce new shear web moulds each time a slight change in the shear web geometry is required. Therefore, shear webs 16 are presently designed to accommodate a range of shell thicknesses, with additional adhesive 24 being required in the bond lines to fill the gaps between the shear web flanges 20 and the blade shell 14 in the case of thin shell designs. However, the adhesive 24 is expensive and relatively heavy, and the use of additional adhesive 24 to fill the larger gaps between the shear webs 16 and blade shell 14 is not optimal. It also does not allow for independent optimization of the adhesive thickness in the bond lines.

Against this background, it is an object of the present invention to provide an improved method of making a shear web and associated cost-effective mould tooling that allows shear webs of varying dimensions to be made without the need for bespoke moulds to be produced each time a change in shear web design is required.

SUMMARY OF THE INVENTION

The present invention provides a method of making shear webs for a wind turbine blade. The method comprises providing an elongate male mould tool having a longitudinally-extending upper mould surface and a longitudinally-extending first side wall. A shim is provided adjacent and attached to the first side wall of the mould tool. The shim has an inner surface facing towards the first side wall, an outer surface facing away from the first side wall, and an upper surface defining an extension of the upper mould surface. A flange structure is provided that comprises a flange portion and a projecting portion. The projecting portion extends along the length of the flange portion and projects transversely from a surface of the flange portion. Fibrous reinforcing material is arranged on the upper mould surface. The flange structure is arranged with respect to the mould tool such that the projecting portion at least partially overlies the upper surface of the shim and the flange portion at least partially overlies the outer surface of the shim. The fibrous reinforcing material is integrated with the projecting portion of the flange structure by means of a matrix material to form the shear web. The shear web is removed from the mould tool with the shim remaining attached to the mould tool.

For the avoidance of doubt, the steps of the method may be performed in any suitable order. In particular, the method is not limited to any particular order in which the various components forming the shear web are arranged on the mould assembly. Also, for the avoidance of doubt, the term 'overlies' as used herein does not require components to be in direct contact. For example, the projecting portion of the flange structure may overlie the upper surface of the shim with reinforcing material provided in-between. The method may involve the step of attaching the shim to the mould tool. Alternatively, the shim may already be attached to the mould tool prior to commencing the manufacturing process.

For the avoidance of doubt, reference to arranging components of the shear web on the mould surface does not require there to be direct contact between those components and the mould surface. This wording is intended to include the possibility of these components being placed on top of other components and/or there being one or more other materials and/or layers between those components and the mould surface. For example, the mould surface may be covered with a gel coat before fibrous reinforcing material is arranged on the mould surface. Also, parts of the flange structure or layers of reinforcing material may be arranged on the mould surface on top of other layers forming the shear web.

The present invention also provides a shear web mould assembly for making a shear web for a wind turbine blade. The mould assembly comprises an elongate male mould tool having a longitudinally-extending upper mould surface and a longitudinally-extending first side wall. The mould assembly further comprises a longitudinally-extending shim having an attachment portion for attaching to the first side wall of the mould tool and a shaping portion for supporting a flange structure of the shear web. The attachment portion of the shim may be attached to the first side wall of the mould tool by means of one or more fixing devices. The shaping portion of the shim has an upper surface that forms an extension of the upper mould surface of the mould tool.

The shim may be detachable from the mould tool. This allows the shim to be removed from the mould tool and replaced with a shim having a different shape and/or size. The dimensions of the mould may therefore be readily adjusted to make shear webs of varying size or shape without requiring new mould tools to be produced each time an adjustment in the shear web dimensions is required.

The dimensions of the shim may be selected according to a required height of the shear web in a direction transverse to a direction of longitudinal extension of the shear web.

The method of making shear webs according to the present invention may comprise the step of attaching the shim to the first side wall of the mould tool. Alternatively, the shim may be pre-attached to the side wall of the mould tool.

The method may comprise detaching the shim from the mould tool after removing the shear web from the mould tool, and replacing the shim with another shim having a different size or shape according to a required height or flange angle of a subsequent shear web to be manufactured.

The shim may be made from any suitable material, for example wood, metal, plastic or composite materials. The shim may advantageously be made from a non-stick material or comprise a non-stick coating. Suitable non-stick materials include polytetrafluoroethylene (PTFE).

The shim may be provided in the form of a plurality of shim sections. The shim may therefore be referred to as a segmented shim. References herein to a shim also encompass references to shim sections. The shim sections may be arranged adjacent to one another along the length of the side wall of the mould tool. The shim sections may be fixed to the side wall of the mould tool. The shim sections may have the same size and/or shape as each other. Alternatively, at least two adjacent shim sections may have a different shape and/or size to one another.

The method may comprise detaching and exchanging one or more of the shim sections between moulding cycles. Providing the shim as a plurality of shim sections facilitates manufacturing, handling and storage of the shims. It also provides a convenient means of adjusting the dimensions of the shear web to be produced along only a part of the length of the shear web since only one or more sections of the shim may be exchanged for shim sections having a different size and/or shape between moulding cycles.

The one or more fixing devices may include a plurality of fasteners which extend respectively through a plurality of holes provided in the shim. The fasteners may be threaded fasteners, for example threaded bolts or pins. A plurality of threaded apertures may be defined in the first side wall of the mould tool for engaging with the one or more fixing devices. The threaded apertures may be provided in the form of blind bores. The threaded apertures may advantageously be defined respectively by a plurality of inserts embedded in the side wall of the mould tool.

The shim or shim sections may be clamped to the first side wall of the mould tool. For example, the shim may be clamped by means of a longitudinally-extending brace configured to bear against the outer surface of the shim. The brace serves to spread the clamping load evenly over the shims or shim sections and avoids stress concentrations on the shims. The brace may be provided with a plurality of holes through which the plurality of fasteners may extend before extending through the holes in the shims.

The brace may be configured to releasably clamp the shim to the first side wall of the mould tool. The shim may be removed from the mould tool by removing or loosening the brace. The brace therefore provides a convenient means of attaching and detaching the shims from the mould tool.

The brace may comprise a plurality of brace sections. The brace sections may be arranged with gaps between at least two adjacent brace sections. The gaps accommodate thermal expansion in the brace during the moulding and curing process. The brace sections also conveniently allow shim sections to be interchanged by only loosening or removing individual sections of the brace. The brace may take the form of a belt extending in a longitudinal direction of the shim at a side wall thereof. The belt-type brace may have a width dimension less than a height dimension of the shim side wall. The belt-type brace may have a width dimension significantly less than a height dimension of the shim side wall. The belt-type brace may have a width dimension less than half a height dimension of the shim side wall. The belt-type brace may have a width dimension substantially constant along its length along the shim side wall. The belt-type brace may be recessed in a longitudinal groove along the outer, side wall of the shim. The belt-type brace may fit snugly in a longitudinal groove along the outer, side wall of the shim. Alternatively, in embodiments, the shim or segmented shims may be held in position at the mould tool using an adhesive cement such as glue or silicon rubber type adhesive or such like.

The flange structure of the shear web may be retained relative to the mould tool by means of one or more brackets. The brackets may be attached to the brace. The brackets may be attached to the shim in particular at a side wall thereof. The or each bracket may be pivotable such that it can be moved into or out of contact with the flange. The brackets may be attached to the shim via a respective hinge block fixed to the shim in particular at a side wall thereof. The brackets may be attached to the brace via a hinge block fixed to the brace.

The mould tool may include a second side wall on an opposite side of the mould surface to the first side wall. A second shim may be attached to the second side wall. The second shim may be a segmented shim as described above. The means of attachment of the second shim to the second side wall may be the same as the means of attachment described above in relation to the first shim.

The fibrous reinforcing material for forming the shear web may comprise one or more first layers and one or more second layers. The fibrous reinforcing material and the flange structure may be arranged such that at least part of the projecting portion of the flange structure is located between the one or more first layers and the one or more second layers. The fibres of the fibrous reinforcing material may comprise any suitable fibres, for example glass or carbon fibres.

Optional features of the invention discussed above or described in the following description or recited in the claims are applicable to the invention when expressed in terms of a method or when expressed in terms of an apparatus.

BRIEF DESCRIPTION OF THE DRAWINGS

Reference has already been made by way of background to FIG. 1, which shows a wind turbine blade comprising shear webs, as viewed from the root end of the blade.

In order that the present invention may be more readily understood, embodiments of the invention will now be described, by way of non-limiting example only, with reference to the following figures in which.

DETAILED DESCRIPTION

Figure 2:
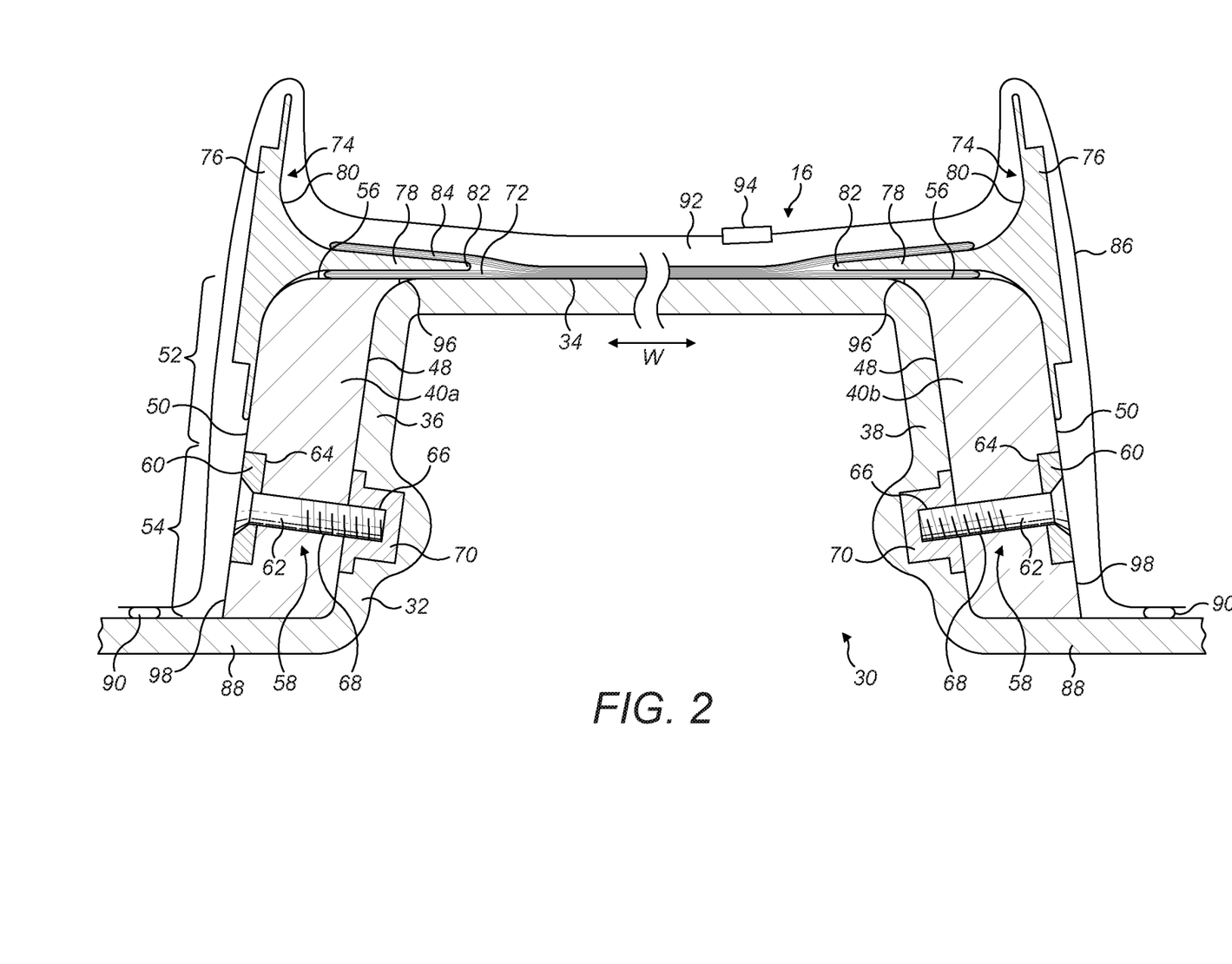
FIG. 2 is a cross-sectional view of a shear web supported on a shear web mould tool comprising shims attached to side walls of the mould tool.

FIG. 2 shows a shear web mould assembly 30 in accordance with an example of the present invention. The mould assembly 30 in this example comprises a male mould tool 32. In this example the mould tool 32 is of fibre-composite construction, e.g. comprising glass reinforcing fibres embedded in a resin matrix, but in other embodiments the mould tool 32 may be made of any suitable material, for example metal.

The mould tool 32 has an upper mould surface 34, which extends in a longitudinal direction transversely to the plane of the page. The length of the mould surface 34 in the longitudinal direction is selected according to a required length of the shear web 16 to be manufactured.

The mould tool 32 further includes first and second side walls 36, 38, which also extend longitudinally, transversely to the plane of the page. The width W of the mould surface 34 is selected according to a required height H (see FIG. 1) of the shear web 16. For illustrative purposes, the width W of the mould tool is truncated in FIG. 2, as indicated by the broken lines.

The mould assembly 30 includes first and second detachable shims 40a, 40b, which are arranged respectively adjacent to the first and second side walls 36, 38 of the mould tool 32. Each shim 40a, 40b has an inner surface 48 facing a respective side wall 36, 38 of the mould tool 32, and an outer surface 50 facing away from said side wall 36, 38. The shims 40a, 40b extend longitudinally alongside the respective side walls 36, 38. Each shim 40a, 40b comprises a shaping portion 52 and an attachment portion 54. In the cross-sectional view of FIG. 2, the attachment portion 54 is defined by a lower portion of the shim 40a, 40b, whilst the shaping portion 52 is defined by an upper portion of the shim 40a, 40b. The shaping portions 52 of the shims 40a, 40b each have an upper surface 56 that provides a lateral extension of the mould surface 34, when viewed in cross-section as shown in FIG. 2.

The attachment portions 54 of the respective shims 40a, 40b are attached to the respective side walls 36, 38 of the mould tool 32 by fixing devices 58. In this example, the fixing devices 58 include a brace 60 and a plurality of fasteners 62. These are shown in this example in the form of threaded bolts (two of which are shown in the cross-sectional view of FIG. 2). The brace 60 may be made from any suitable material, but is preferably made from metal, and in this example is made from steel. In other examples, there may be no brace 60.

In this example, the brace 60 is received within a correspondingly-sized groove 64 provided in the outer surface 50 of the shim 40a, 40b. The side walls 36, 38 of the mould tool 32 are provided with a series of threaded bores 66 (two of which are shown in FIG. 2). The braces 60 and the shims 40a, 40b are each provided with a series of apertures 68, which are configured to align with the respective threaded bores 66 defined in the side walls 36, 38 of the mould tool 32 when the shims 40a, 40b are arranged in positon.

As shown in FIG. 2, the bolts 62 each extend through the mutually-aligned apertures 68 in the braces 60 and the shims 40a, 40b, and the ends of the bolts 62 are received within the respective threaded bores 66. Tightening the bolts 62 causes the braces 60 to bear against the outer surfaces 50 of the respective shims 40a, 40b and clamp the shims 40a, 40b firmly against the side walls 36, 38 of the mould tool 32. The braces 60 serve to spread the load over the shims 40a, 40b and thus pressure concentrations on the shims 40a, 40b are avoided. This advantageously prevents the shims 40a, 40b from buckling or distorting.

In this example the threaded bores 66 in the side walls 36, 38 of the mould tool 32 are defined by threaded inserts 70 (also referred to as bushings) that are embedded in the side walls 36, 38 of the mould tool 32 during manufacture of the mould tool 32. These inserts 70 are preferably made of metal. In the case of a fibre-composite mould, it is advantageous to define the threaded bores 66 by means of inserts 70 in the mould tool 32 because it is not generally possible to machine a threaded bore accurately in a fibre-reinforced structure. The bores 66 may be blind bores, as in this example, which is advantageous since it avoids breaking a vacuum that is established during a vacuum-bagging process, as discussed later.

By way of example, FIG. 2 shows various components arranged on the mould assembly to be integrated together to form a shear web 16. In this example, the process of laying up the shear web 16 involves initially arranging one or more first layers 72 of fibrous reinforcing material on the mould surface 34. The fibrous reinforcing material is preferably glass fabric but it may comprise any suitable fibrous material, for example the fibres may include carbon fibres in other examples. The fibrous reinforcing material may, for example, comprise dry fibres, or it may comprise fibres that are pre-impregnated with semi-cured resin, e.g. so-called 'prepreg' materials.

As shown in FIG. 2, first and second longitudinally-extending flange structures 74 of the shear web 16 are arranged along the longitudinal edges of the mould assembly 30. In this example, the flange structures 74 are substantially T-shaped in cross-section, and each flange structure 74 comprises a flange 76 and a projecting portion 78 (also referred to as an 'upstand'), which projects transversely from an inner surface 80 of the flange 76. The flange structures 74 in this example are preferably pultruded components, comprising reinforcing fibres such as glass and/or carbon fibres in a pre-cured resin matrix. In other examples the flange structures 74 could be moulded parts or parts formed by any suitable means. The flange structures 74 need not necessarily be preformed components, but may instead be formed by arranging dry or prepreg fabric layers on the mould apparatus 30.

Each flange structure 74 is supported at least partially by a respective shim 40a, 40b. In this example, each flange structure 74 is arranged such that its projecting portion 78 overlaps the upper surface 56 of a respective shim 40a, 40b, whilst the inner surface 80 of the flange 76 on one side of the projecting portion 78 overlaps the outer surface 50 of the shaping portion 52 of the shim 40a, 40b. Depending upon the length of the projecting portion 78 and the width of the shim 40a, 40b, the end 82 of the projecting portion 78 may overlap the moulding surface 34 of the mould tool 32, as shown for example in FIG. 2.

The outer surface 50 of the shaping portion 52 is suitably inclined relative to the upper surface 56 of the shim 40a, 40b at such an angle to correspond substantially with an angle defined between the projecting portion 78 of the flange structure 74 and the inner surface 80 of the flange 76. The upper surface 56 and the outer surface 50 of the shaping portion 52 of the shim 40a, 40b therefore define a contour that matches an inner contour of the flange structure 74. As such, the flange 76 sits substantially flush against the outer surface 50 of the shim 40a, 40b, whilst the projecting portion 78 sits substantially flat on top of the upper surface 56 of the shim 40a, 40b.

One or more second layers 84 of fibrous reinforcing material, which may be the same or different to the materials comprising the first layers 72, are preferably arranged on top of the one or more first layers 72 and on top of the projecting portions 78 of the respective flange structures 74, as shown by way of example in FIG. 2. The projecting portions 78 of the flange structures 74 may thereby be located between the first layer(s) 72 and the second layer(s) 84 so that the projecting portions 78 ultimately become embedded between layers 72, 84 of fibrous reinforcing material.

Whilst not illustrated, the method may also include arranging core material such as foam or balsa, for example, between the first and second layer(s) 72, 84 in regions where the shear web 16 is required to have increased stiffness. The shear web 16 would therefore have a sandwich-panel structure in these regions.

Once the various components 72, 74, 84 forming the shear web 16 have been arranged on the mould assembly 30, the components are covered with a vacuum film 86, also referred to as a vacuum bag. In this example the vacuum bag 86 is sealed against a process flange 88 of the mould tool 32 using sealing tape 90. In other examples the vacuum bag 86 may be sealed at another suitable location, such as against the inner surfaces 80 of the flanges 76. The vacuum bag 86 forms a sealed region 92 encapsulating the assembled components forming the shear web 16.

Once the vacuum bag 86 has been sealed, air is removed from the sealed region 92 using a vacuum pump (not shown) through ports 94 provided in the vacuum film 86. The vacuum bag 86 therefore bears tightly against the various components.

The next step in the manufacturing process involves integrating the various components of the shear web 16 together. Optionally, and in particular in the case that dry fibrous material is used for the first and/or second layers 72, 84, the method may involve supplying resin into the sealed region 92 for example in a resin infusion step, e.g. in a so-called vacuum assisted resin transfer moulding (VARTM) process. In the case that prepreg materials are employed, it may not be necessary to supply additional resin because resin is already present in the prepreg materials.

Optionally, further seals 96 may be provided, for example to prevent resin from entering the region between the shims 40a, 40b and the side walls 36, 38 of the mould tool 32. In the embodiment shown in FIG. 2, the further seals 96 are provided at the interface between the upper mould surface 34 of the mould tool 32 and the upper surfaces 56 of the respective shims 40a, 40b. These seals 96 may be formed by the application of a suitable sealant, for example a silicon sealant.

The process may involve applying heat to the assembly, for example via an autoclave and/or via hot air blowers, and/or via integrally-heated mould tooling. The application of heat assists resin flow and accelerates curing, i.e. hardening, of the resin. The cured resin serves to integrate the various components 72, 74, 84 of the shear web 16 together. Once the resin has cured, the vacuum bag 86 can be removed and the shear web 16 can be removed from the mould assembly 30 ('de-moulded').

As the shims 40a, 40b are fixed to the side walls 36, 38 of the mould tool 32, they remain in place when the shear web 16 is removed from the mould assembly 30. Accordingly, it will be appreciated that the shims 40a, 40b are fixed to the mould tool 32 before, during and after the moulding process.

The shims 40a, 40b may be removed and replaced with shims having a different size and/or shape in order to manufacture shear webs 16 having a different height and/or shear webs 16 with flanges 76 having a different angle. The use of shims 40a, 40b in this context therefore presents a flexible tooling solution and avoids the need for new mould tools to be prepared each time a change in the shear web geometry is required. Examples of this will now be described with reference to FIGS. 3 to 5.

Figure 3:
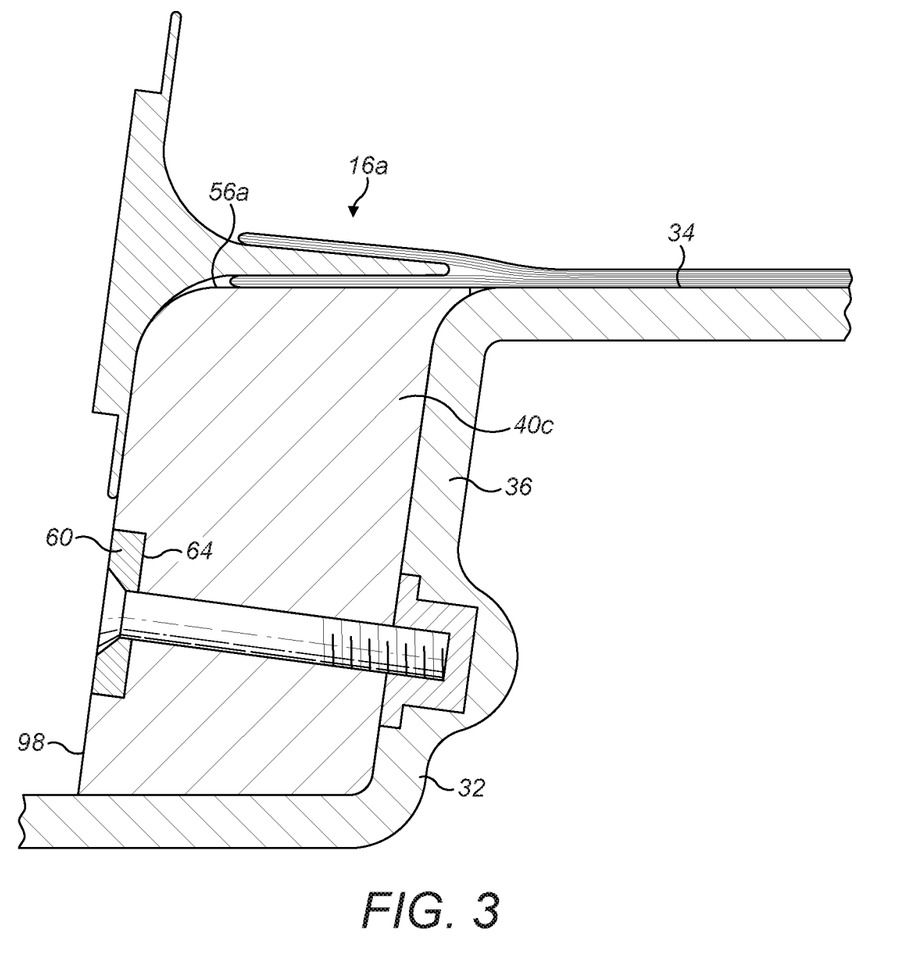
FIG. 3 shows part of the mould tool of FIG. 2, in which a relatively wide shim is attached to the side wall of the mould tool.

Referring to FIG. 3, this shows a shim 40c having an increased width in comparison to the shims 40a, 40b shown in FIG. 2. It will be appreciated that the wider shim 40c has a wider upper surface 56a in comparison to the upper surfaces 56 of the shims 40a, 40b shown in FIG. 2. Accordingly, it provides an increased lateral extension of the mould surface 34. The use of a wider shim 40c therefore allows a shear web 16a having a slightly increased height to be manufactured, in comparison with the mould assembly 30 shown in FIG. 2.

Figure 4:
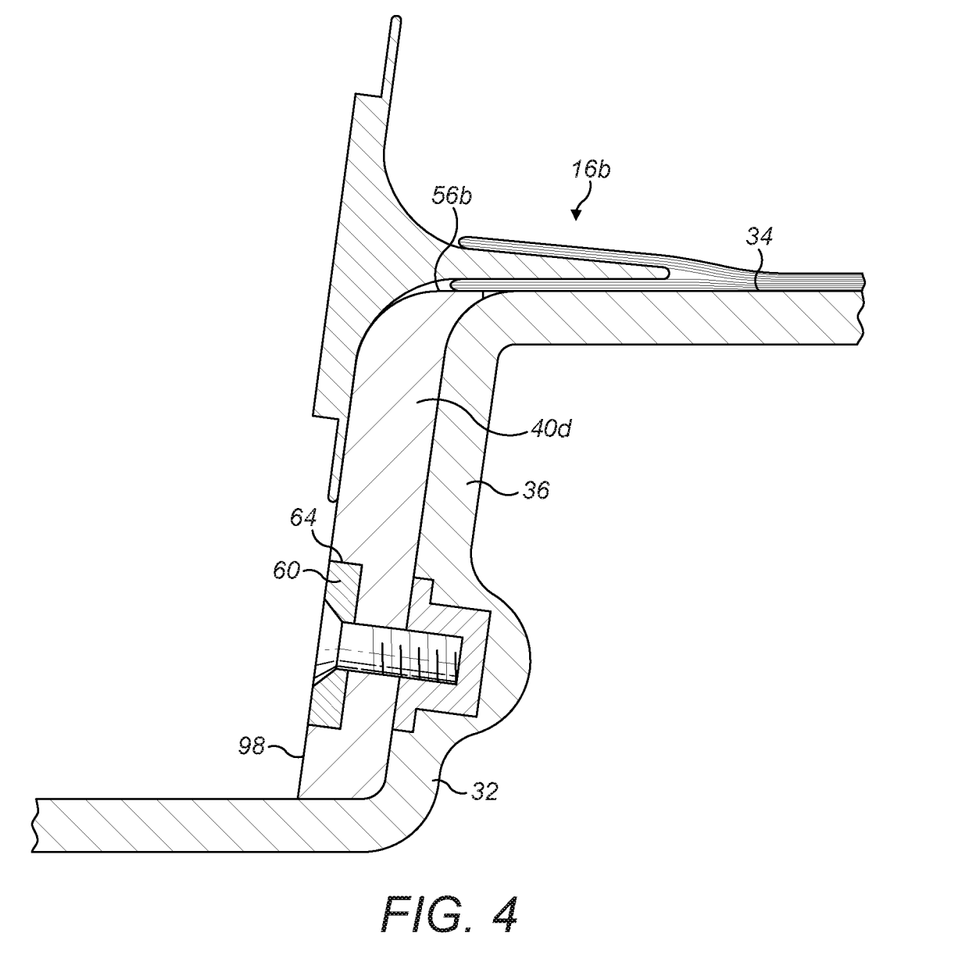
FIG. 4 shows part of the mould tool of FIG. 2, in which a relatively narrow shim is attached to the side wall of the mould tool.

Referring to FIG. 4, this shows a shim 40d having a reduced width in comparison to the shims 40a, 40b shown in FIG. 2. It will be appreciated that the narrower shim 40d has a narrower upper surface 56b in comparison to the upper surfaces 56 of the shims 40a, 40b shown in FIG. 2. Accordingly, it provides a shorter lateral extension of the mould surface 34 than the shims 40a, 40b shown in FIG. 2. The use of a narrower shim 40d therefore allows a shear web 16b having a slightly reduced height to be manufactured, in comparison with the mould assembly 30 shown in FIG. 2.

Figure 5:
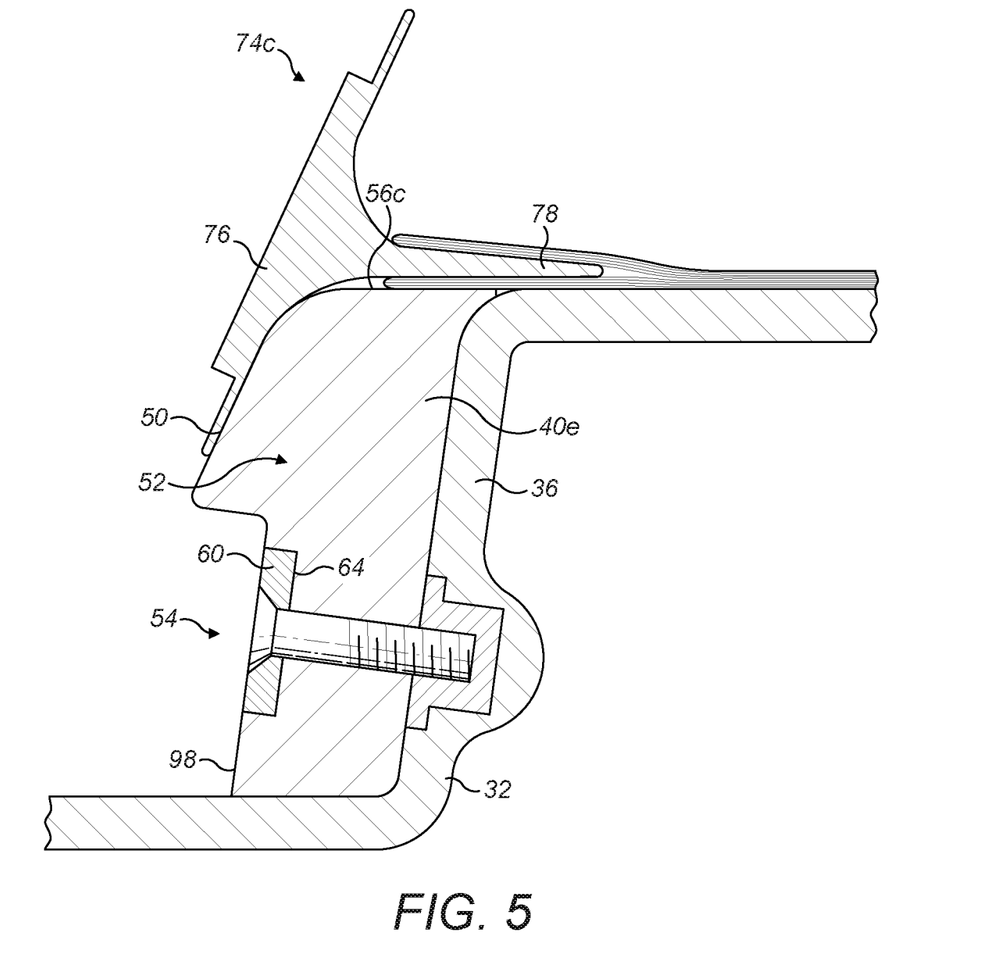
FIG. 5 shows part of the mould tool of FIG. 2, in which a shim having a relatively steeply inclined outer surface is attached to the side wall of the mould tool in order to produce a shear web having a relatively steeply inclined flange.

Referring to FIG. 5, this shows a shim 40e having a shaping portion 52 with an outer surface 50 that is more steeply inclined with respect to the upper surface 56c of the shim 40e, in comparison to the shims 40a, 40b shown in FIGS. 2 to 4. This shim 40e is suitable for use in conjunction with a flange structure 74c in which the flange 76 is relatively steeply inclined relative to the projecting portion 78, as shown in FIG. 5. Such flange structures 74c may be utilised where the flange 76 is required to be bonded to an inclined portion of the blade shell 14, for example in regions of high curvature of the blade shell 14.

In the example shown in FIG. 5, the shaping portion 52 of the shim 40e overhangs the attachment portion 54 of the shim 52c. This is an optional feature and this example serves to illustrate that the shims can have a variety of shapes, and that the shape and configuration of the shaping portion 52 of a shim can be designed independently of the shape and configuration of the attachment portion 54.

In each of the examples shown in FIGS. 2 to 5, the attachment portion 54 of the shim 40a-e has an outer surface 98 that is substantially parallel to the side wall 36 of the mould tool 32. It will be noted that the grooves 64 provided in the attachment portions 54 of the various shims 40a-e to accommodate the brace 60 are identical in each of the examples, so that the brace 60 is interchangeable between each of the shims 40a-e.

In other examples, the attachment portion 54 of the shim 40a-e could be wider than the shaping portion 52, such that the shaping portion 52 may be inset with respect to the attachment portion 54. Whilst the shims 40a-e have a groove 64 to accommodate the brace 60, this is not essential and in other embodiments a groove 64 may not be present. Whilst the shaping portion 52 and the attachment portion 54 of the shims 40*a-e* in these examples are integral, in other embodiments these may be separate parts that are fixed together to form a two-part shim.

Figure 6:
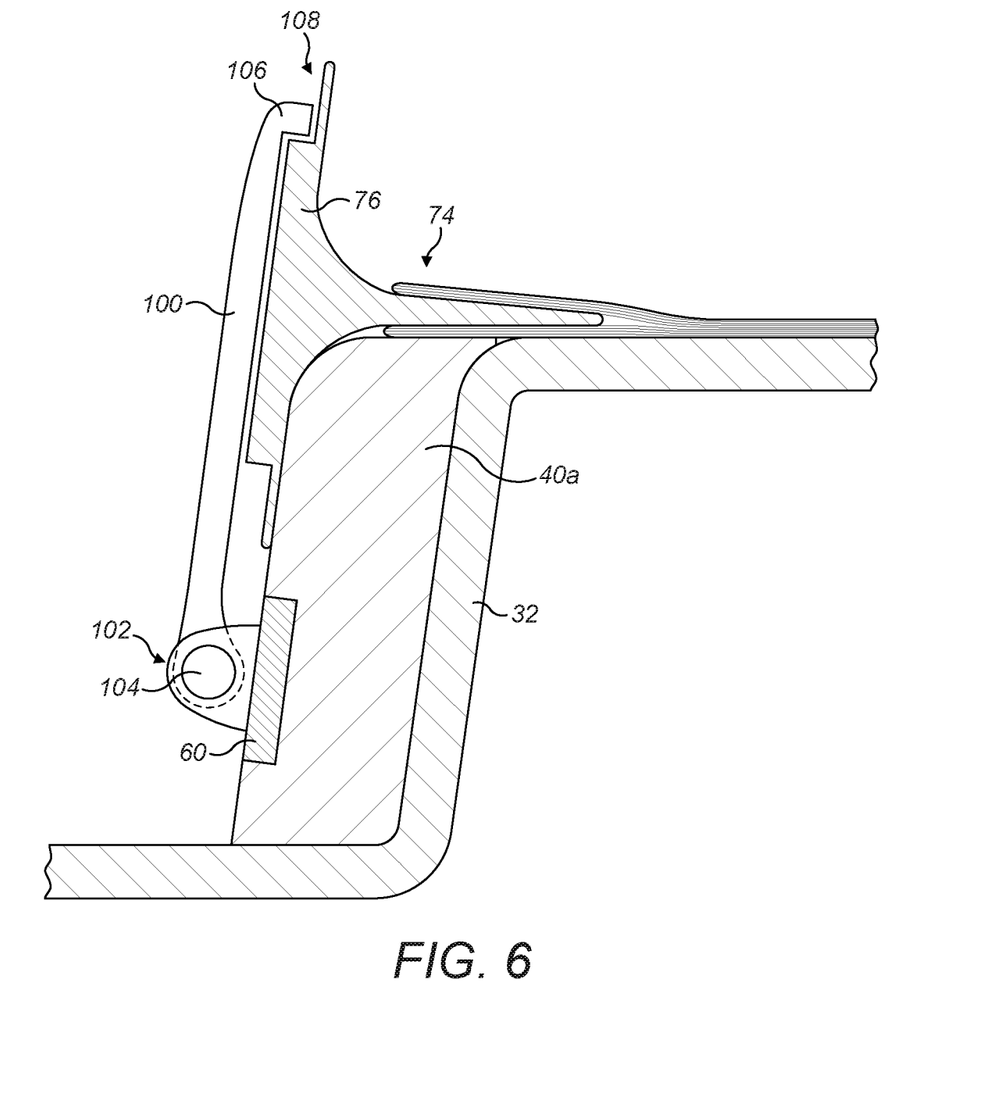
FIG. 6 is a cross-sectional view of part of a shear web mould tool showing an adjustable bracket for retaining a flange of the shear web.
Figure 7:
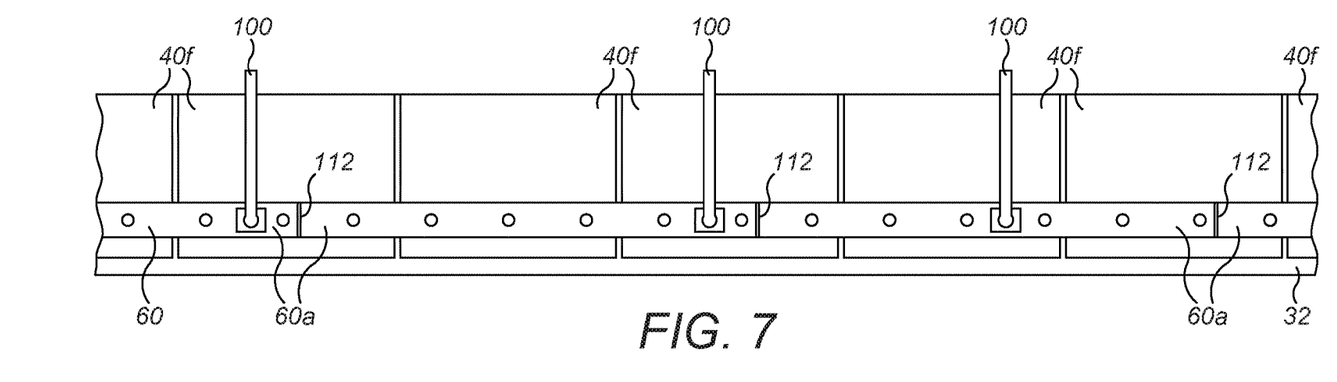
FIG. 7 is a side view of a shear web mould tool illustrating a segmented shim clamped to the mould tool by a brace.

Referring now to FIG. 6, this shows a bracket 100 in the form of a restraining arm, which may optionally be used in conjunction with any of the shims 40*a-e* discussed above or indeed any other such shims according to the present invention. The bracket 100 serves to secure the flange structure 74 in place against the shim 40*a*. The bracket 100 may take any suitable form and be made of any suitable material, for example a metal such as steel. A plurality of brackets 100 are preferably provided, and there may be an arbitrary spacing between adjacent brackets 100 as illustrated in FIG. 7.

Referring still to FIG. 6, a fixed end 102 of the bracket 100 is preferably mounted to the brace 60. In other examples the bracket 100 could be secured directly to the shim 40*a*. However, securing the bracket 100 to the brace 60, as opposed to the shim 40*a* directly, avoids the risk of damaging the shim 40*a*. It also allows the brace 60 and brackets 100 to form a sub-assembly so that the brackets 100 may advantageously remain attached to the braces 60 when shims 40*a* are exchanged on the mould tooling 32. This reduces the time taken to reconfigure the mould assembly when the shear web geometry is adjusted between moulding cycles.

The fixed end 102 of the bracket/restraining arm 100 may be attached to the brace 60 by an articulated joint 104, for example as illustrated in FIG. 6. Alternatively, the fixed end 102 of the bracket/restraining arm 100 may be attached to the shim 40*a* by hinge block such as an articulated joint 104, for example as illustrated in FIG. 6. In this example, the hinged block, or articulated joint 104 is in the form of a toothed nut, but it may take another form in other embodiments, for example it could be a sprung joint. The hinged block or articulated joint 104 enables the bracket 100 to pivot such that the angle of the bracket 100 can be varied to match the angle of the flange 76. This ensures that the same brackets 100 can accommodate flanges 76 arranged at any angle, such as the inclined flange 76 of the flange structure 74*c* shown in FIG. 5.

A free end 106 of the bracket 100 may be arranged to engage with a suitable engagement feature 108 of the flange structure 74. This advantageously provides a positive interlock between the bracket 100 and the flange structure 74. For example, in the illustrated embodiment of FIG. 6, the engagement features 108 are in the form of grooves at the longitudinal edges of the flange 76. The free end 106 of the bracket 100 is hook-shaped, and the hook engages with a groove 108 to form a positive interlock. In this example, the grooves 108 in the flange 76 also have another function, namely they act as so-called 'glue catchers' to catch any excess adhesive that may be squeezed out at the bond lines when the flanges 76 are bonded to the blade shell 14. This example illustrates that the bracket 100 therefore may advantageously engage with features that may already be present in the design of the flange structures 74 for another purpose. A hinged block or articulated joint 104 may be secured to a shim 40*a* by direct attachment on the shim surface or in a recess in the shim surface. Attachment may be by means of a threaded engagement or by adhesive cement between the hinge block or articulated joint 104 and the shim 40*a*. Any suitable adhesive may be used. Epoxy resin adhesive may be preferred.

The shims 40*a-e* according to the present invention may extend along the whole or part of the length of the mould tool 32. In particular examples, the shims 40*a-e* may comprise a plurality of shim sections 40*f* arranged adjacent to one another along the whole or part of the length of the mould tool 32. This is illustrated, by way of example, in FIG. 7, which shows a side view of a plurality of shim sections 40*f* arranged against a mould tool 32. This arrangement may equally be referred to as a 'segmented shim'.

Forming a shim 40*a-e* as a plurality of shim sections 40*f* is advantageous since it avoids the need to manufacture and store very long shims. It also facilitates handling of the shims 40*a-e* and allows the shims to be interchanged on the mould tools 32 by a single operator. Furthermore, forming the shim 40*a-e* in a plurality of sections 40*f* reduces any adverse effects that may result form thermal expansion of the shim, for example it helps to avoid warping of the shim. Small gaps 110 may optionally be provided between the shim sections 40*f* if required to allow for thermal expansion.

A further advantage of the segmented shim design shown in FIG. 7 is that each shim section 40*f* may have the same size and/or shape as a neighbouring shim section 40*f* or a different size and/or shape. This is advantageous because it allows the height of the shear web 16 to be adjusted independently in different longitudinal regions of the shear web. It also allows different types of flange structures 74 to be used at different longitudinal regions of the mould assembly 30. In this respect, and for example, the mould assembly 30 may be configured with a combination of the shims 40*a-e* shown in any of FIGS. 3 to 5 at different longitudinal stations of the mould tool 32.

Each shim 40*a-e* or shim section 40*f* may be of constant or varying cross-section along the length of the shim 40*a-e* or shim section 40*f*. In particular, a shim section 40*f* may have a different cross-sectional profile at one end of the shim section 40*f* in comparison to the other. For example, a shim section 40*f* may increase or decrease in width along its length, and/or the angle of the outer surface 50 of the shaping portion 52 may vary along the length of the shim section 40*f*. This advantageously avoids abrupt changes in the profile of the shim 40*a-e* along its length and thus allows smooth transitions in the height and/or flange angle of the shear web 16 to be formed.

FIG. 7 also serves to illustrate the longitudinal extension of the brace 60. The use of a brace 60 for securing the shims/shim sections 40*a-f* to the mould tool 32 ensures that the shims/shim sections 40*a-f* are secured firmly to the mould tool 32 whilst avoiding the need for gluing, laminating or directly bolting the shims/shim sections 40*a-f* to the mould tool 32. Furthermore, the provision of a brace 60 ensures that clamping loads are evenly spread across the shims/sections 40*a-f* and thus damage to the shims/shim sections 40*a-f* is avoided. The use of braces 60 to clamp the shims/shim sections 40*a-f* in place advantageously allows a relatively quick change over of shims between moulding operations in the event that a change in mould geometry is required.

Advantageously, and as illustrated in FIG. 7, the brace 60 may comprise a series of brace sections 60*a*. Forming the brace 60 in a plurality of brace sections 60*a* advantageously facilitates changing an individual shim section 40*f* or a subset of shim sections 40*f* between manufacturing cycles, because it is not necessary to unclamp the entire shim 40*a-e*. Only the required section(s) 60*a* of the brace 60 need to be removed to detach and exchange the necessary shim sections 40*f*, for example if a subsequent shear web 16 is to be manufactured with a slightly different geometry along only part of its length.

Forming the brace 60 in a series of longitudinal sections 60*a*, as opposed to a single piece also facilitates the manufacture, handling and storage of the brace 60. The various longitudinal sections of the brace 60 may be arranged with gaps 112 between adjacent sections 60a, as shown in FIG. 7. These gaps 112 advantageously allow for thermal expansion of the brace 60, which may occur during the heating process, such that buckling of the brace 60 and damage to the shims 40a-e is avoided. In FIG. 7, brackets 100 are illustrated fixed to the brace 60. The brackets may alternatively be fixedly attached directly to the shim 40a, in particular to shim sections 40f.

Figure 8:
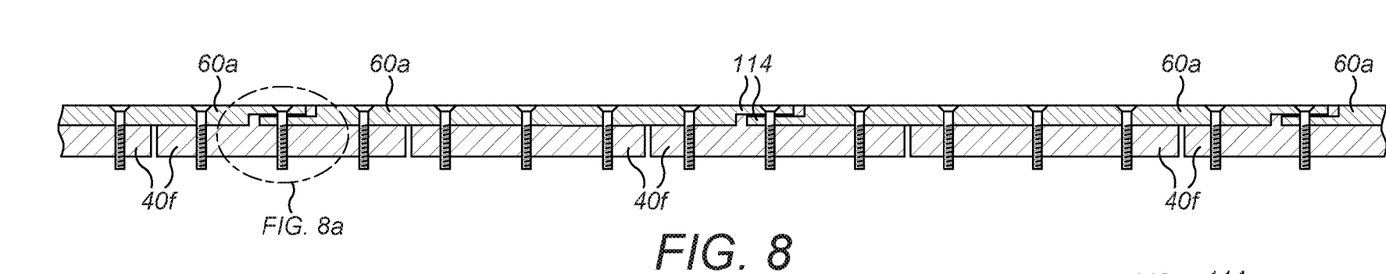
FIG. 8 is a cross-sectional plan view through a brace.

FIG. 8 is a schematic cross-sectional view of a brace 60 and shim sections 40f illustrating how the brace 60 shown in FIG. 7 may optionally be arranged. In this example, each section 60a of the brace 60 has a stepped end portion 114, i.e. an end of reduced thickness (half thickness in this example). As shown most clearly in the close-up view of FIG. 8a, the stepped ends 114 of adjacent brace sections 60a are arranged in overlapping relation, akin to a lap joint. The stepped ends 114 are provided with holes 116 for receiving a bolt 62, such that the bolt 62 extends through mutually aligned holes 116 in the overlapping stepped ends 114 of adjacent brace sections 60a before extending through the shim 40f to connect, for example, with a threaded aperture in the side wall of the mould tool as described previously.

Figure 8A:
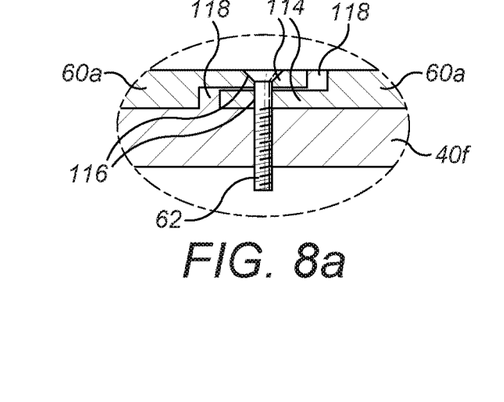
FIG. 8a is an enlarged view of part of FIG. 8.

One or both of the mutually aligned holes 116 in the stepped end portions may be a slot that extends slightly in the longitudinal direction of the brace 60. The holes 116 in the stepped end portions 114 are located such that when the brace sections 60a are bolted together there are small gaps 118 between adjacent brace sections 60a to accommodate thermal expansion. These gaps 118 may optionally be filled with sealer. The overlapping bolted connection between adjacent brace sections 60a is advantageous since it ensures that the clamping force exerted by the brace 60 is substantially continuous in the longitudinal direction despite the thermal-expansion gaps 118 between sections 60a of the brace 60.

Figure 9:
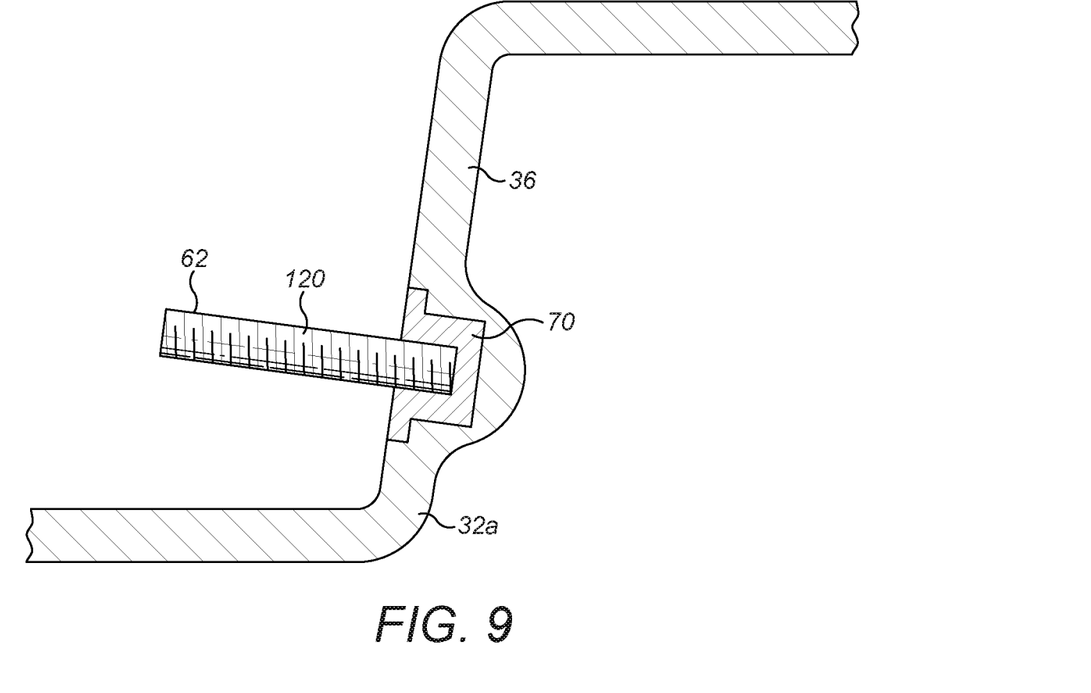
FIG. 9 shows an alternative example of a shear web mould tool in which fasteners project from the side wall of the mould tool.

FIG. 9 shows an alternative embodiment of a mould tool 32a, in which fasteners 62 may be provided that project out from the side wall 36 of the mould tool 32a. In this example, each fastener may be in the form of a pin 120 having a threaded bolt or shaft 120. In common with the previous example, a series of inserts 70 in the form of bushings defining blind threaded bores are provided in the side wall 36 of the mould tool 32a. One end of the fastener 62 may be screwed into the bushing 70, such that the threaded shaft 120 projects from the side wall 36 of the mould tool 32a. In other embodiments the fasteners 62 may be integrated with the mould tool 32a during manufacture of the mould tool 32a and/or formed integrally with the inserts 70. Having fasteners 62 that project from the side walls 36, 38 of the mould 32a facilitates the process of aligning and attaching the shims/shim sections 40a-f to the mould tool 32a as the shims can simply be inserted onto the respective fasteners 62.

Figure 10:
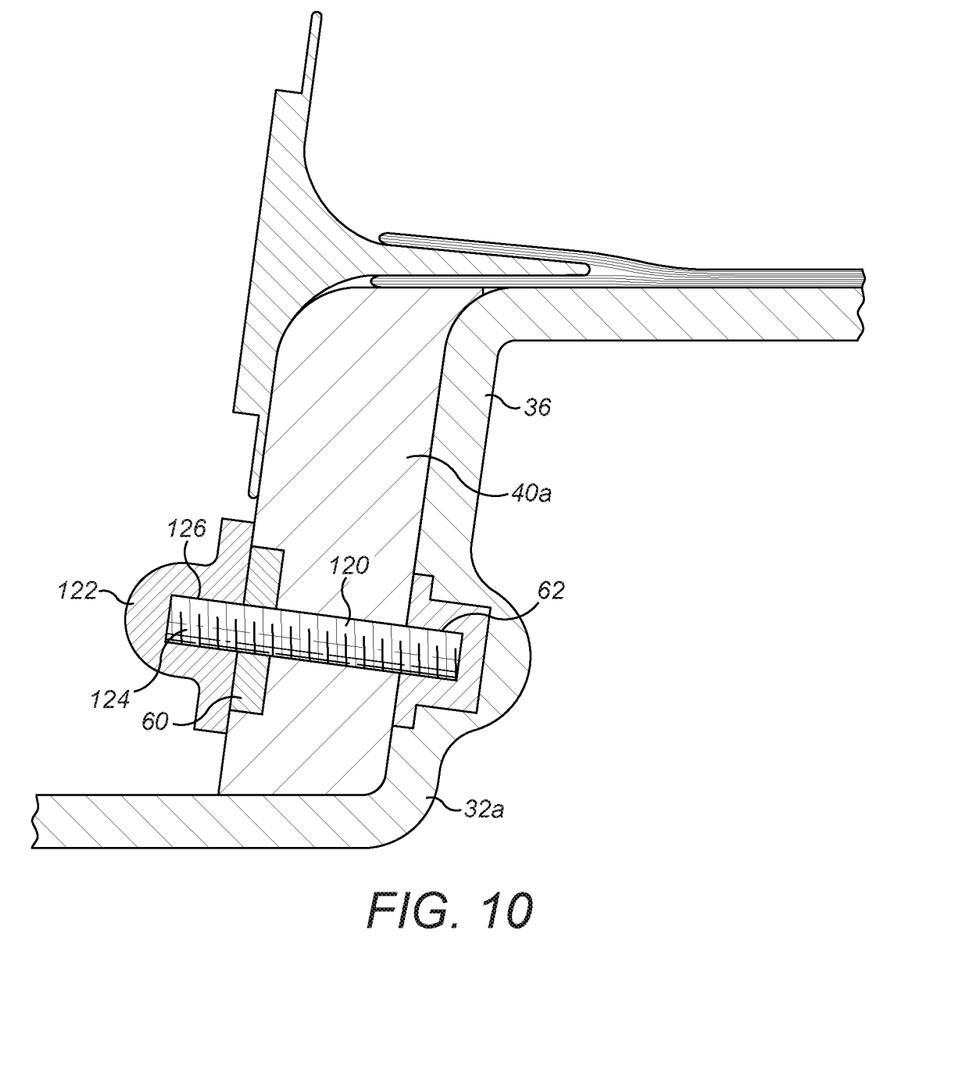
FIG. 10 shows a shim secured to the side wall of the mould tool of FIG. 9.

FIG. 10 shows a shim 40a fitted against the side wall 36 of the mould tool 32a. In this particular example, the shim 40a is secured to the mould tool 32a by means of caps 122 that are received on a free end 124 of the fastener 62. The cap 122 defines an internal threaded bore 126. Alternatively, nuts or other suitable fasteners 62 may be used. For example, the fasteners 62 may only be threaded at one or both of its ends. The caps 122 are tightened against the brace 60, which exerts a clamping force against the shim 40a as previously described.

The shims/shim sections 40a-f described in the above examples are preferably made of polytetrafluoroethylene (PTFE). An advantage of PTFE is that it has 'non-stick' properties, and this may facilitate detachment of the shims/shim sections 40a-f from the mould tool 32, 32a. In other embodiments the shims/shim sections 40a-f may be made of any suitable material, for example wood, metal, plastic or a composite material. Suitable materials for the shims/shim sections 40a-f are preferably materials that are dimensionally stable, but easy to machine and shape. For example, the shims/shim sections 40a-f may be made from nylon, aluminium or Jabroc®, which is a wood laminate material. In certain embodiments, the shims/shim sections 40a-f may have a non-stick coating, e.g. a PTFE coating, although this is not essential.

The above embodiments are provided by way of example only, and it will be appreciated that various modifications may be made to the specific embodiments without departing from the scope of the invention as defined in the accompanying claims. For the avoidance of doubt, it is intended that features are interchangeable between embodiments, such that any of the features described or shown in connection with one embodiment or example may be used in relation to any of the other examples or embodiments described herein.

The fixing devices described above provide an advantageously low cost solution. However, it should be appreciated that these fixing devices are exemplary only and are not intended to limit the scope of the present invention. Other embodiments are envisaged in which the shims/shim sections 40a-f may be fixed e.g. clamped to the mould tool 32, 32a by other means. For example, the mould tooling may include a suitable clamp, for example in the form of a vice, that may extend along the whole or part of the mould tool for clamping the shims to the mould tool. In such examples it will be appreciated that fasteners such as bolts may not be required, and the shims and the side walls of the mould tool may therefore not require apertures.

The invention claimed is:

1. A shear web mould assembly for making a shear web for a wind turbine blade, the mould assembly comprising:
   an elongate male mould tool having a longitudinally-extending upper mould surface and a longitudinally-extending first side wall;
   a longitudinally-extending detachable shim having an attachment portion for attaching to the first side wall of the mould tool and a shaping portion for supporting a flange structure of the shear web,
   wherein the attachment portion of the shim is attached to the first side wall of the mould tool by one or more fixing devices, and the shaping portion of the shim has an upper surface that forms an extension of the upper mould surface of the mould tool, wherein the one or more fixing devices include a longitudinally extending brace configured to bear against the outer surface of the shim and configured to releasably clamp the shim to the first side wall, and wherein said one or more fixing devices further include a plurality of fasteners which extend respectively through a plurality of holes provided in the shim, wherein said brace is provided with a plurality of holes through which the plurality of fasteners may extend before extending through the holes in said shims.

2. The shear web mould assembly of claim 1, wherein the shim comprises a plurality of shim sections arranged adjacent to one another and fixed to the first side wall of the mould tool.

3. The shear web mould assembly of claim 1, wherein at least two adjacent shim sections have a different shape and/or size to one another.

4. The shear web mould assembly of claim 1, wherein a plurality of threaded apertures are defined in the first side wall of the mould tool for engaging with the one or more fixing devices.

5. The shear web mould assembly of claim 4, wherein the threaded apertures are defined respectively by a plurality of inserts embedded in the side wall of the mould tool.

6. The shear web mould assembly of claim 1, further comprising one or more brackets for retaining a flange of the shear web in position against the mould assembly.

7. The shear web mould assembly of claim 6, wherein the one or more brackets is pivotable such that it can be moved into or out of contact with the flange.

8. The shear web mould assembly of claim 7, wherein the one or more brackets is attached to said brace via a hinge block fixed to said brace.

9. The shear web mould assembly of claim 1, wherein said brace comprises a plurality of brace sections, wherein said brace sections are arranged with gaps between at least two adjacent brace sections, said gaps being capable of accommodating thermal expansion in the brace during a moulding and curing process.

10. The shear web mould assembly of claim 1, wherein said brace takes the form of a belt extending in the longitudinal direction of said shim at a side wall thereof, wherein said brace has a width dimension less than a height dimension of said shim side-wall.

11. The shear web mould assembly of claim 1, wherein said brace is recessed in a longitudinal groove along said outer, side wall of said shim.

12. A method of making shear webs for a wind turbine blade, comprising:

providing the shear web mold assembly of claim 1;

providing a flange structure comprising a flange portion and a projecting portion, the projecting portion extending along the length of the flange portion and projecting transversely from a surface of the flange portion;

arranging fibrous reinforcing material on the upper mould surface;

arranging the flange structure with respect to the mould tool such that the projecting portion at least partially overlies the upper surface of the shim and such that the flange portion at least partially overlies the outer surface of the shim;

integrating the fibrous reinforcing material and the projecting portion of the flange structure by introducing a matrix material to form the shear web; and removing the shear web from the mould tool with the shim remaining attached to the mould tool.

13. The method of claim 12, wherein the method comprises providing the shim in the form of a plurality of shim sections.

14. The method of claim 12, further comprising detaching the shim or a shim section from the mould tool after removing the shear web from the mould tool, and replacing the shim or shim section with another shim or shim section having a different size or shape according to a required height or flange angle of a subsequent shear web to be manufactured.

15. The method of claim 12, further comprising retaining the flange structure in position relative to the mould tool using one or more brackets attached to the brace.

* * * * *